United States Patent [19]
DiSanto et al.

[11] Patent Number: 5,187,609
[45] Date of Patent: Feb. 16, 1993

[54] ELECTROPHORETIC DISPLAY PANEL WITH SEMICONDUCTOR COATED ELEMENTS

[76] Inventors: Frank J. DiSanto, 27 Par Ct., North Hills, N.Y. 11030; Denis A. Krusos, 1 Lloyd Harbor Rd., Lloyd Harbor, N.Y. 11743

[21] Appl. No.: 675,733
[22] Filed: Mar. 27, 1991
[51] Int. Cl.⁵ .................. G02B 26/00; G09G 3/34
[52] U.S. Cl. .................... 359/296; 340/787
[58] Field of Search ................ 359/296; 340/787

[56] References Cited

U.S. PATENT DOCUMENTS

| | | | |
|---|---|---|---|
| 4,068,927 | 1/1978 | White | 359/296 |
| 4,742,345 | 5/1988 | DiSanto et al. | 359/228 |
| 5,077,157 | 12/1991 | DiSanto et al. | 359/296 |

FOREIGN PATENT DOCUMENTS 0248182 10/1989 Japan .................. 340/787

*Primary Examiner*—Eugene R. LaRoche
*Assistant Examiner*—Evelyn A. Lester

[57] ABSTRACT

A triode-type electrophoretic display includes a fluid-tight envelope for containing an electrophoretic fluid with suspended pigment particles and has a glass viewing window upon which has been deposited a plurality of parallel cathode members. A plurality of parallel Indium Tin Oxide cathode members are deposited on a surface of the window and are, in one embodiment, overcoated by a layer of $SiO_2$. A layer of photoresist is then deposited over the $SiO_2$ followed by a layer of Ni. The Ni and photoresist are etched down to the $SiO_2$ layer to form a plurality of parallel grid members residing in a second plane above and insulated from the plane of the cathode members. The cathode and anode members form a matrix with a plurality of intersections and are selectively electrically chargeable to induce movement of the particles within the fluid to or away from the individual intersections, localized concentrations of particles at the intersections being visible through the viewing window. In another embodiment, an additional layer of semiconductor is applied over the grid and photoresist insulation after etching.

20 Claims, 3 Drawing Sheets

ELECTROPHORETIC DISPLAY PANEL WITH SEMICONDUCTOR COATED ELEMENTS

FIELD OF THE INVENTION

The present invention relates to electrophoretic display panel apparatus and methods for fabricating same, and more particularly, to a triode-type electrophoretic display panel having improved electrical insulation between row and column conductors thereby providing enhanced reliability and image clarity.

DESCRIPTION OF THE PRIOR ART

A variety of electrophoretic display panels are known. Of most direct pertinence to the present invention are those shown and described in U.S. Pat. No. 4,655,897 entitled "Electrophoretic Display Panels and Associated Methods", U.S. Pat. No. 4,742,345, entitled "Electrophoretic Display, Panel Apparatus and Methods Therefor", and U.S. Pat. No. 4,772,820 entitled "Monolithic Flat Panel Display Apparatus". Each of the foregoing U.S. Patents is in the name of Frank J. DiSanto and Denis A. Krusos, the inventors herein, and are assigned to the assignee herein, Copytele, Inc. The display panels shown in the foregoing patents operate upon the same basic principle, viz., if a suspension of electrically charged pigment particles in a dielectric fluid is subjected to an applied electrostatic field, the pigment particles will migrate through the fluid in response to the electrostatic field. Given a substantially homogeneous suspension of particles having a pigment color different from that of the dielectric fluid, if the applied electrostatic field is localized it will cause a visually observable localized pigment particle migration. The localized pigment particle migration results either in a localized area of concentration or rarefaction of particles depending upon the sign and direction of the electrostatic force and the charge on the pigment particles. The electrophoretic display apparatus taught in each of the foregoing U.S. Patents are triode type displays having a plurality of independent, parallel cathode row conductor members deposited in the horizontal on one surface of a glass viewing screen. A layer of insulating photoresist material deposited over the cathode members and photoetched down to the cathode members to yield a plurality of insulator strips positioned at right angles to the cathode members, forms the substrate for a plurality of independent, parallel column grid conductor members running in the vertical direction. A glass cap member forms a fluid-tight seal with the viewing window along the cap's peripheral edge for containing the fluid suspension and also acts as a substrate for the anode which is a conductor layer deposited on the interior flat surface of the cap. When the cap is in place, the anode surface is in spaced parallel relation to both the cathode members and the grid members. Given a specific particulate suspension, the sign of the electrostatic charge which will attract and repel the pigment particles will be known. The cathode member voltage and the grid member voltage can then be ascertained such that when a particular voltage is applied to the cathode and another voltage is applied to the grid, the area proximate their intersection will assume a net charge sufficient to attract or repel pigment particles in suspension in the dielectric fluid. Since numerous cathode and grid lines are employed, there are numerous discrete intersection points which can be controlled by varying the voltage on the cathode and grid members to cause localized visible regions of pigment concentration and rarefaction.

The electrophoretic displays described above utilize numerous electrically and physically independent cathode and grid members. For example, an $8\frac{3}{8}"\times 11"$ display screen with a resolution of 200 lines per inch has 2,200 horizontal cathode row members and 1,700 vertical column grid members. In general, it is desireable to have the greatest number of horizontal and vertical members with the smallest possible width. This results in increased resolution and screen brightness, i.e., the more coordinates, the greater the resolution, the smaller the width of each element, the less the electrophoretic effect is obscured. Thus, the electrophoretic display raises a technical challenge that is common in the field of densely-packed miniaturized electrical devices, viz., while it is possible, using photoetching techniques and the like, to create extremely small circuit components to permit compact circuits, it is sometimes difficult to avoid undesired current paths causing short circuits due to the close proximity of the miniature elements. I electrophoretic displays this problem is exacerbated by the fact the respective independent elements are all submersed in a common dielectric fluid and share, in close proximity, a common space defined by the display envelope. There is therefore a tendency for unwanted currents to arise, e.g., along the wall of the insulator separating cathode and grid elements at a particular location or locations, i.e., "wall current". A wall current if developed appears as a short circuit between a cathode element and a grid element and results in a display error.

It is therefore an object of the present invention to provide an electrophoretic display which prevents unwanted currents, such as, "wall currents" or other short circuits from occurring between conductor members.

It is a further object to provide an insulator configuration having a increased dielectric strength for more effectively insulating independent electrical elements in an electrophoretic display.

It is yet another objective to provide an improved method of constructing electrophoretic displays which yield an insulator configuration with an increased dielectric strength for more effectively insulating independent electrical elements in the display.

SUMMARY OF THE INVENTION

The problems and disadvantages associated with conventional electrophoretic displays are overcome by the present invention which includes a electrophoretic display having a fluid-tight envelope with a portion thereof which is at least partially transparent. An electrophoretic fluid is contained within the envelope and has pigmented particles suspended therein. A plurality of elongated substantially parallel horizontal conductor members are disposed within a first plane and contained within the envelope. A plurality of elongated substantially parallel vertical conductor members is also contained within the envelope electrically insulated from the horizontal members and disposed within a second plane, the first and the second planes being substantially parallel, the horizontal and vertical members forming a matrix with a plurality of intersections when viewed along a line perpendicular to the first and second planes. The horizontal members are insulated from the vertical members at least partially by a semiconductor coating. The horizontal and vertical members are each selectively electrically chargeable to induce movement of the particles within the fluid. The particles are at least partially visible through the transparent portion of the envelope.

BRIEF DESCRIPTION OF THE FIGURES

For a better understanding of the present invention, reference is made to the following detailed description of an exemplary embodiment considered in conjunction with the accompanying drawings, in which.

DETAILED DESCRIPTION OF THE FIGURES

Figure 1:
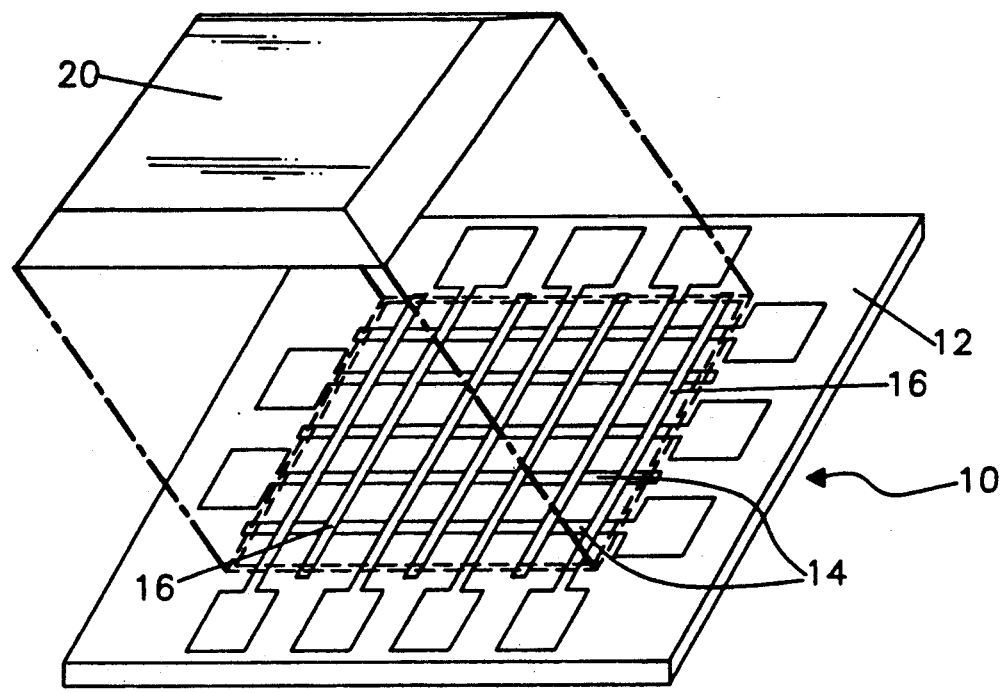
FIG. 1 is an exploded perspective rear view of a triode-type electrophoretic display pannel in accordance with prior patents issued in the name of the inventors herein.

FIG. 1 shows the rear side of an electrophoretic display panel 10 as exemplified, e.g., by U.S. Pat. No. 4,742,345 to Di Santo et al., this patent being incorporated herein by reference for showing the general construction and components of an electrophoretic display panel. The panel 10 includes a faceplate 12 typically formed from glass which serves as a substrate upon which is deposited a plurality of independent, electrically conductive cathode members 14 (horizontal rows) using conventional deposition and etching techniques. It is preferred that the cathode members 14 be composed of Indium Tin Oxide (ITO) as set forth in U.S. Pat. No. 4,742,345. A plurality of independent grid conductor members 16 are superposed in the horizontal over the cathode members 14 and are insulated therefrom by an interstitial photoresist layer 18 (see FIG. 2). The grid members 16 may be formed by coating the photoresist layer 18 with a metal, such as nickel, using sputtering techniques or the like and then selectively masking and etching to yield the intersecting but insulated configuration shown in FIGS. 1 and 2. Each cathode and grid member 14, 16 terminates at one end in a contact pad or is otherwise adapted to permit connection to display driver circuitry (not shown). An anode cap 20 is sealably affixed to the faceplate 12 and over the cathode and grid members 14 and 16 to form an envelope for containing the dielectric fluid/pigment particle suspension. The anode cap 20 is formed from an insulating material, such as glass, and has an inner surface coating of conductor material to form the anoda. Thus by applying voltages to the cathode and grid members 14 and 16 and the anode 20, suspended pigment particles in the dielectric fluid can be made to accumulate near, or disperse from, the intersections of selected cathode and grid members 14 and 16 to translate these voltages into a visible display.

The discrete cathode and grid members 14 and 16 of the electrophoretic display 10 can assume a variety of voltages during operation for controlling the display operations of erase, hold and write at the numerous points of intersection defining a cathode/grid matrix. A workable panel would have a large number of intersections, e.g., 2,200 ×1,700 or a total of 3,740,000 separately addressable intersection points. For ease of illustration, however, a small set of intersections: are shown in FIG. 1 and only a single intersection is depicted in the remaining figures. The dimensions of the respective elements have also been greatly enlarged for illustration and are not necessarily in proportion to an actual operational device. Representative illustrations of electrophoretic displays, their components and electrical circuitry can be seen by referring to U.S. Pat. Nos. 4,742,345 and 4,772,820, each being awarded to the inventors herein and which are incorporated by reference herein.

Figure 2:
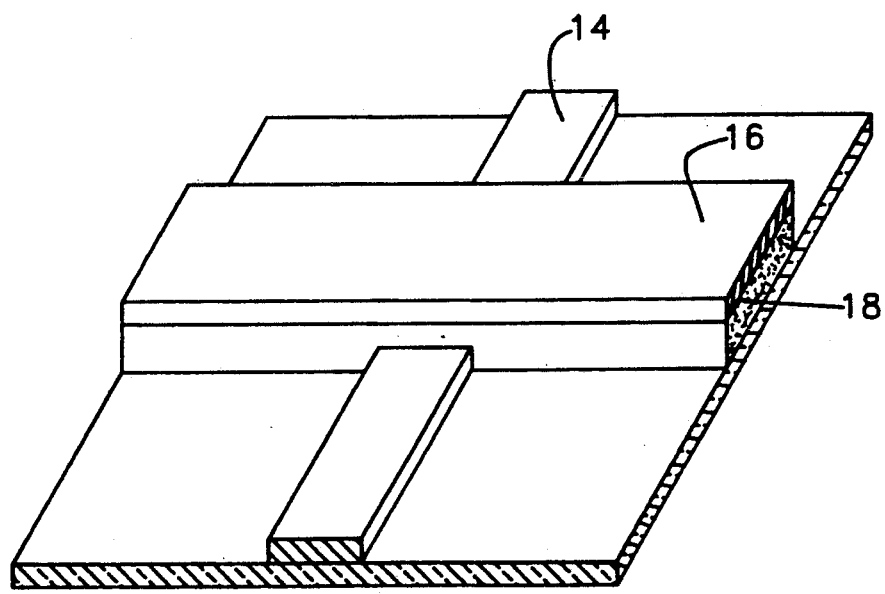
FIG. 2 is a perspective view of a fragmental section of the interior surface of an electrophoretic display panel faceplate as shown in FIG. 1, in the area of the intersection of a single cathode element with a single grid element.

The fragmental section of the electrophoretic display depicted in FIG. 2 shows a single cathode member 14 overlayed by a single interstitial photoresist insulator layer 18 insulating a single intersecting grid member 1 from the cathode member 14. A difficulty which is sometimes encountered in electrophoretic displays having a construction like that shown in FIG. 2 is that the relatively small distance between cathode members 14 and grid members 16 can be inadvertantly electrically bridged, typically along the wall of the insulator layer 18 proximate the intersection of the members. This shorting of the members interferes with correct display patterns and results in a display error, e.g., that which should be displayed is not or that which should not be displayed is, etc.

Figure 3:
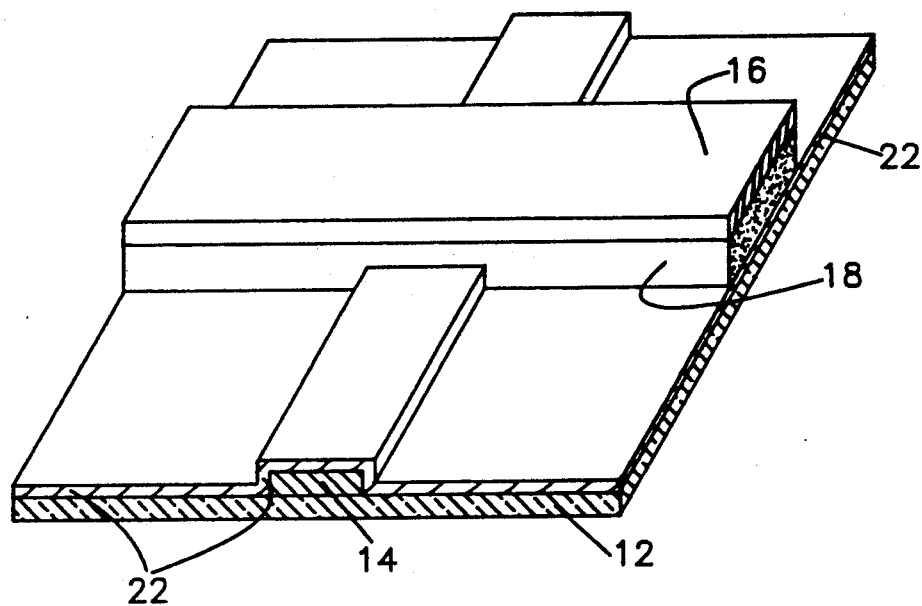
FIG. 3 is a fragmental section of a triode-type electrophoretic display faceplate as shown in FIG. 2, but including an insulator configuration in accordance with a first exemplary embodiment of the present invention.
Figure 4:
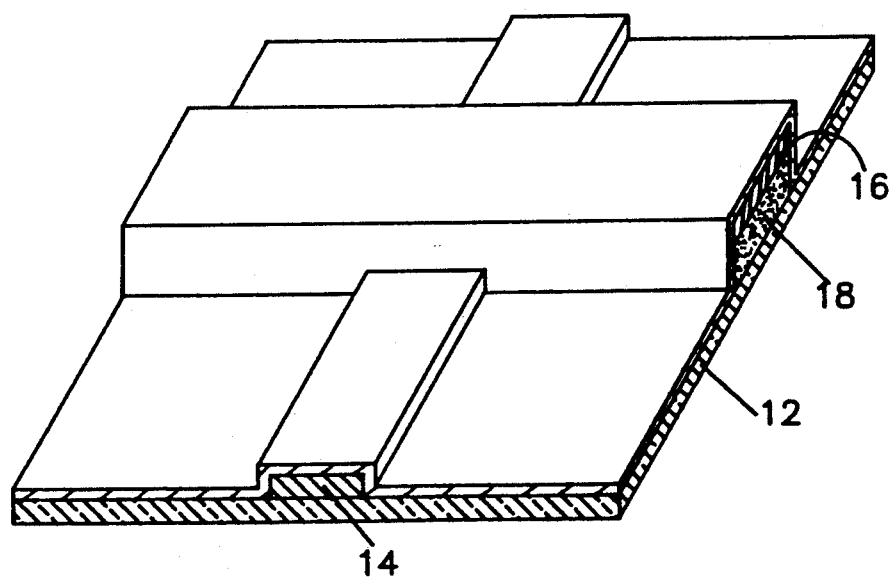
FIG. 4 is a fragmental section of a triode-type electrophoretic display faceplate as shown in FIGS. 2 and 3, but including an insulator configuration in accordance with a second exemplary embodiment of the present invention.
Figure 5:
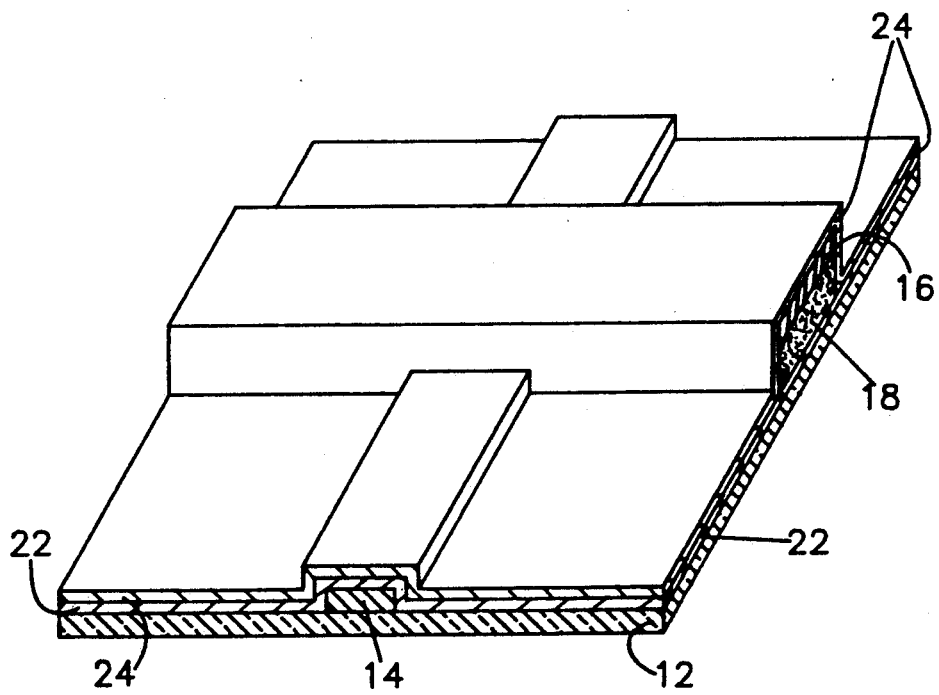
FIG. 5 is a fragmental section of a triode-type electrophoretic display faceplate as shown in FIGS. 2, 3 and 4, but including an insulator configuration in accordance with a third exemplary embodiment of the present invention.

In FIGS. 3, 4 and 5, the same reference numbers as those used in FIGS. and 2 are employed to describe equivalent elements having the same form and function. FIG. 3 shows a fragmentary section of an electrophoretic display in accordance with a first exemplary embodiment of the present invention. The display is like that shown in FIG. 2, but with an improved insulator configuration which prevents the aforementioned short circuiting between the cathode 14 and grid 16 members. The display section shown in FIG. 3 includes a semiconductor material layer 22 disposed over the faceplate 12 and cathode members 14 and under the insulation layer 18. This configuration stops electrical shorting between the cathode and grid members 14 and 16 and is formed in accordance with the following manufacturing procedure. After etching the cathode row members 14, as described in U.S Pat. No. 4,742,345, and prior to applying the insulator layer 18, the glass faceplate 12 and the cathode row members 14 are coated with a layer 22 of semiconductor material, such as, $SiO_2$ or SiN. The coating is preferably applied by means of an evaporation and deposition process as is known in the art. After the semiconductor coating 22 is applied, the insulator 18 and the grid members 16 are deposited thereover as described in U.S. Pat. No. 4,742,345.

FIG. 4 shows another embodiment of the present invention in which the device shown and described in FIG. 2 is completely overcoated with an outer semiconductor material layer 24, such as, $SiO_2$ or SiN to provide increased electrical insulation between the cathode 14 and grid members 16. Unlike the embodiment shown in FIG. 3, the embodiment shown in FIG. 4 is formed by the deposition of semiconductor over a completed faceplate 12/cathode 14/insulator 18/grid 16 assembly as shown in FIG. 2. Thus, the semiconductor layer is not sandwiched between the faceplate 12, cathode 14 and the insulator 18. As in the previous embodiment, however, the coating is preferable, applied by an evaporation process.

A third embodiment of the present invention is shown in FIG. 5. This third embodiment is formed by combining the processes described in reference to FIGS. 3 and 4. Thus, in a device constructed like that shown in FIG. 5, the faceplate 12 and cathode members 14 are coated with a first interstitial semiconductor layer 22 prior to formation of the insulator layer 18 and the grid members 16 as in the first embodiment. In addition, a second outer semiconductor layer 24 is deposited by evaporation on the completed structure comprised of the faceplate 12, cathode members 14, interstitial semiconductor layer 22, photoresist insulator layer 18 and grid members 16, after formation of the insulator layer 18 and grid members 16, as in the second embodiment.

In each embodiment described above, the semiconductor coating(s) 22 and/or 24 increase the dielectric strength of insulation between the cathode 14 and grid members 16, prevent the formation of conductor pathways (short circuits), especially wall currents across the surface of the insulator 18, and thereby satisfy the objectives of the invention.

It should be understood that the embodiments described herein are merely exemplary and that a person skilled in the art may make many variations and modifications without departing from the spirit and scope of the invention as defined in the appended claims.

I/We claim:

1. An electrophoretic display comprising:
   (a) a fluid-tight envelope having a portion thereof which is at least partially transparent;
   (b) an electrophoretic fluid contained within said envelope, said fluid having pigmented particles suspended therein;
   (c) a plurality of elongated substantially parallel horizontal conductor members disposed within a first plane and contained within said envelope; and
   (d) a plurality of elongated substantially parallel vertical conductor members contained within said envelope electrically insulated from said horizontal members and disposed within a second plane, said first and said second planes being substantially parallel, said horizontal members and said vertical members forming a matrix with a plurality of intersections when viewed along a line perpendicular to said first and said second planes, said horizontal members being insulated from said vertical members at least partially by a semiconductor coating, said horizontal members and said vertical members each being selectively electrically chargeable to induce movement of said particles within said fluid, said particles being at least partially visible through said transparent portion of said envelope.

2. The device of claim 1, wherein said envelope includes a substantially flat faceplate, a central portion of which is said transparent portion of said envelope, said faceplate forming a substrate supporting said horizontal members, and a cap member having an end wall and side walls, said side walls defining a hollow within said cap member, said side walls sealably affixing to said faceplate to form said envelope.

3. The device of claim 2, wherein said horizontal members are at least partially insulated from said vertical members by an insulator strip underlying each of said vertical members and parallel thereto.

4. The device of claim 3, wherein said semiconductor coating overlies said faceplate proximate said horizontal members and said vertical members and is interposed between said insulator strips and said horizontal members.

5. The device of claim 4, further including a second semiconductor coating overlying said vertical members and said insulator strips.

6. The device of claim 3, wherein said semiconductor coating overlies said vertical members, said insulator strips, said horizontal members and said faceplate where said vertical members, said insulator strips, said horizontal members and said faceplate are exposed to said fluid contained within said envelope.

7. The device of claim 4, wherein said semiconductor coating is $SiO_2$.

8. The device of claim 4, wherein said semiconductor coating is SiN.

9. The device of claim 6, wherein said semiconductor coating is $SiO_2$.

10. The device of claim 6, wherein said semiconductor coating is SiN.

11. The device of claim 4, wherein said electrophoretic display is a triode-type device, said horizontal members constituting the cathode, said vertical members being the grid of said triode and said end wall of said cap member has a conductor layer coating selectively electrically chargeable to induce movement of said pigment particles and constitutes the anode.

12. The device of claim 11, wherein said faceplate is glass, and said horizontal members are Indium-Tin-Oxide.

13. A method for manufacturing an electrophoretic display having a fluid-tight envelope with a substantially flat faceplate and a cap member having an end wall and side walls, said side walls defining a hollow within said cap member, comprising the steps of:
   (a) depositing a plurality of elongated substantially parallel horizontal conductor members upon a surface of said faceplate;
   (b) applying a coating of semiconductor material over said surface of said faceplate and said horizontal conductor members;
   (c) applying a layer of insulator material over said semiconductor coating;
   (d) applying a layer of electrical conductor material over said layer of insulator material;
   (e) etching through said electrical conductor material and said insulator material down to said horizontal members to form a plurality of elongated substantially parallel vertical conductor members electrically insulated from said horizontal members said horizontal members and said vertical members forming a matrix with a plurality of intersections;
   (f) filling said hollow with an electrophoretic fluid; and
   sealably affixing said side walls of said cap to said surface of said faceplate to form said envelope.

14. The method of claim 13, further including the step of applying a second coating of semiconductor material covering said plurality of elongated substantially parallel vertical conductor members, said insulator material layer, said horizontal members and said faceplate after said step of etching.

15. A method for manufacturing an electrophoretic display having a fluid-tight envelope for containing an electrophoretic fluid, said envelope having a substantially flat faceplate and a cap member having an end wall and side walls, said side walls defining a hollow within said cap member, comprising the steps of:
  (a) depositing a plurality of elongated substantially parallel horizontal conductor members upon a surface of said faceplate;
  (b) applying a layer of insulator material over said surface of said faceplate and said horizontal conductor members;
  (c) applying a layer of electrical conductor material over said layer of insulator material;
  (d) etching through said electrical conductor material and said insulator material down to said horizontal members to form a plurality of elongated substantially parallel vertical conductor members electrically insulated from said horizontal members, said horizontal members and said vertical members forming a matrix with a plurality of intersections;
  (e) applying a coating of semiconductor material to said plurality of elongated substantially parallel vertical conductor members, said insulator material layer, said horizontal members and said faceplate
  (f) filling said hollow with said electrophoretic fluid; and
  (g) sealably affixing said side walls of said cap to said surface of said faceplate to form said envelope.

16. The method of claim 13, wherein said semiconductor coating is applied by an evaporation and deposition process.

17. The method of claim 16, wherein said semiconductor is $SiO_2$.

18. The method of claim 17, wherein said faceplate is glass and said horizontal members are Indium Tin Oxide.

19. The method of claim 18, wherein said insulator layer is photoresist.

20. The method of claim 15, wherein said semiconductor coating is $SiO_2$ and is applied by an evaporation and deposition process, wherein said faceplate is glass, said horizontal members are Indium-Tin-Oxide and said insulator layer is photoresist.

* * * * *